United States Patent [19]

Lind

[11] 4,028,456

[45] June 7, 1977

[54] METHOD OF EXTRUDING A WEATHERSTRIP HAVING A PILE STRIP

[75] Inventor: Earl V. Lind, Rochester, N.Y.

[73] Assignee: Schlegel Corporation, Rochester, N.Y.

[22] Filed: July 21, 1975

[21] Appl. No.: 597,408

Related U.S. Application Data

[62] Division of Ser. No. 446,301, Feb. 27, 1974, Pat. No. 3,923,576.

[52] U.S. Cl. .................................. 264/90; 264/93; 264/99; 264/146; 264/173; 264/177 R; 264/209; 264/210 R; 264/257; 264/271; 264/279

[51] Int. Cl.² ...................... B29D 3/00; B29D 9/00; B29D 23/04; B29F 3/00

[58] Field of Search .................. 264/88, 90, 94, 95, 264/98, 145, 146, 150, 151, 171, 173, 176 R, 177 R, 209, 210, 149, 259, 250, 294, 296, 243, 210 R, 99, 100, 93, 257, 271; 156/244; 49/475, 484, 495

[56] References Cited

UNITED STATES PATENTS

| | | |
|---|---|---|
| 3,068,136 | 12/1962 | Reid .................................. 264/151 |
| 3,152,002 | 10/1964 | Wisotzky et al. .................. 264/243 |
| 3,235,438 | 2/1966 | Wisotzky ........................... 264/243 |
| 3,296,661 | 1/1967 | De Moustier ...................... 264/209 |
| 3,359,686 | 12/1967 | Kondolf ............................. 49/475 |
| 3,404,487 | 10/1968 | Johnson ............................. 49/475 |

OTHER PUBLICATIONS

Randolph et al, Plastics Engineering Handbook, Reinhold, N.Y. (1960) p. 501 relied on.

*Primary Examiner*—Willard E. Hoag
*Attorney, Agent, or Firm*—Cumpston & Shaw

[57] ABSTRACT

Method of making a weatherseal is made by extruding a resin base with a relatively thick, flat support portion and a relatively thin, portion U-shaped in cross section and joined to opposite side edges of the support portion to arch over the center of the support portion. While the resin material is still plastic, a pressure differential expands the U-shaped portion to reduce the thickness of the walls of the U-shaped portion, and then each side of the U-shaped portion is cut at a predetermined distance from the support to leave a pair of thin, spaced-apart resilient fins. Then fibrous pile material is secured to the support between the fins to form a double-fin, pile weatherseal.

2 Claims, 5 Drawing Figures

METHOD OF EXTRUDING A WEATHERSTRIP HAVING A PILE STRIP

This is a division of application Ser. No. 446,301, filed Feb. 27, 1974, now U.S. Pat. No. 3,923,576.

THE INVENTIVE IMPROVEMENT

Pile weatherseals having associated sealing fins running longitudinally with the pile material have generally known advantages. Such sealing fins have been applied to pile weatherseals in various ways, and they have been located in the center of the pile, and along both edges of the pile. The invention involves recognition of a simpler and more economical way of making a finned pile weatherseal having fins extending along both side edges of the pile. The invention aims at economy, faster and simpler production methods, and quality construction of the resulting weatherseal.

SUMMARY OF THE INVENTION

In making the inventive weatherseal, a resin base is extruded with a relatively thick, flat support portion and a relatively thin portion U-shaped in cross section and joined to opposite side edge regions of one face surface of the support portion and arching over the support portion. While the resin material is still plastic, a substantially lower pressure outisde the U-shaped portion than inside the U-shaped portion expands the U-shaped portion away from the support portion and reduces the thickness of the wall of the U-shaped portion, and the resin is set with the U-shaped portion expanded. Then each side of the U-shaped portion is cut off at a predetermined distance from the support portion to leave a pair of thin, spaced-apart, resilient fins extending away from the surface of the support portion, and a fibrous pile material is secured to the support portion between the fins. A similar result can be achieved by a cross-head extrusion of a pile strip with a resin base having a U-shaped portion arching over the pile and expanded and cut away to form fins.

DRAWINGS

FIGS. 1 and 2 are schematic diagrams of alternative preferred processes for practicing the invention and schematically showing cross-sectional views of the product at each stage of the process; and FIGS. 3–5 are end elevational views of three preferred forms of products produceable according to the invention.

DETAILED DESCRIPTION

Figure 1:
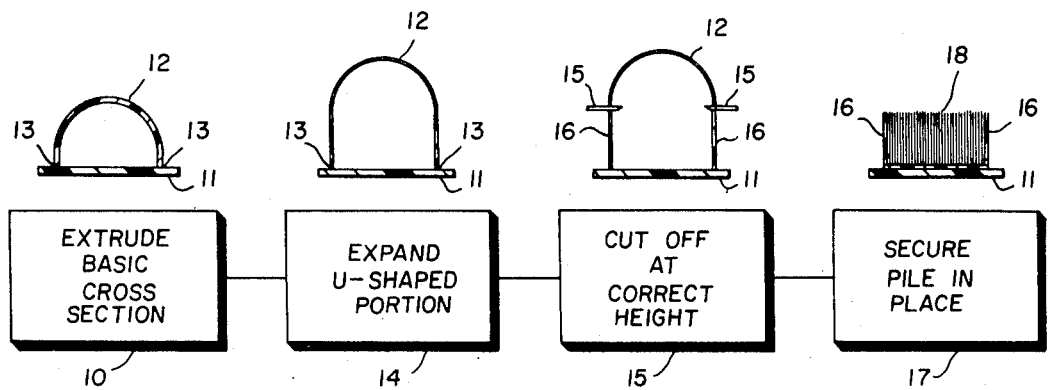
Figure 2:
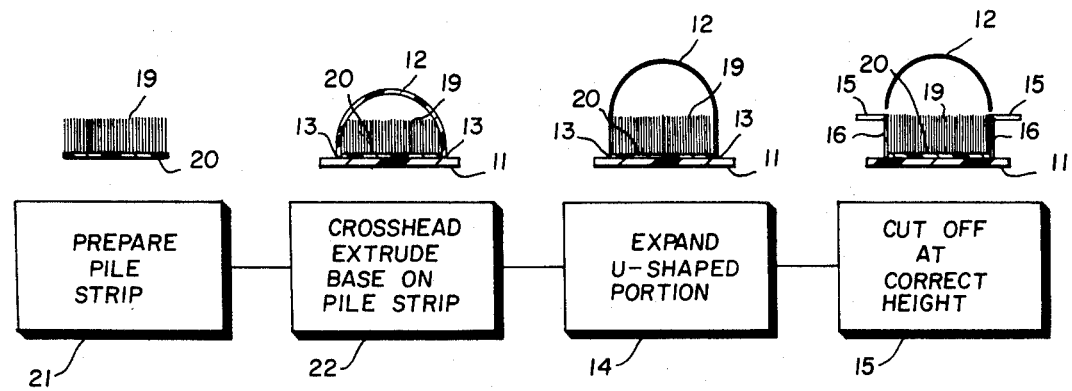
Figure 3:
Figure 4:
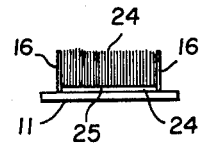

FIGS. 1 and 2 show two alternative processes according to the invention for producing double-fin, pile weatherseals such as shown in FIGS. 3 and 4. Each of the weatherseals includes a fibrous pile material, a fin on each side of the pile, and a resin base, and each is made in indefinite lengths that can be cut and fitted in place to meet many weatherseal requirements. Such weatherseals are commonly used around doors and windows, and the pile material provides resilience and a low-friction, long-wear-life sealing surface, and the fins on opposite sides of the piles wipe against the surface to be sealed and make the seal more airtight and watertight than pile alone could accomplish. The processes illustrated in FIGS. 1 and 2 are describedbelow.

Beginning with the process of FIG. 1, a resin base is formed by extruder 10 to have the illustrated thick, flat support portion 11, and a relatively thin portion 12 U-shaped in cross section and joined to opposite side edge regions 13 of support portion 11 to arch over support portion 11 as illustrated. While the resin material is still plastic, a pressure-differential creating device 14 produces a substantially lower pressure outisde U-shaped portion 12 than inside U-shaped portion 12, either by reducing the outside pressure or increasing the inside pressure, to expand U-shaped portion 12 as illustrated. Since support portion 11 is relatively thick and strong compared to U-shaped portion 12, support portion 11 does not deform under the pressure differential, but U-shaped portion 12 is substantially expanded as illustrated to reduce the thickness of the wall of U-shaped portion 12. Then a cutter 15 cuts both sides of U-shaped portion 12 at a predetermined distance from support portion 11 to leave a pair of thin, spaced-apart, resilient fins 16 extending out from one face surface of support portion 11 as illustrated. Then a device 17 secures pile material 18 in place between fins 16 as illustrated to complete a weatherseal.

Many variables can be made in the above-described process, including the resin material selected, the dimensions of support portion 11 and U-shaped portion 12, the extrusion speeds and temperatures, the pressure differential applied to expand U-shaped portion 12, the method of cutting in device 15, the height of the cut of fins 16, the type of pile material 18, and the manner of securing it in place. The choices for these variables are generally known to those skilled in the art.

In the method of FIG. 2, a strip of pile material 19 having a base 20 is pre-prepared in device 21 in supply lengths available for feeding to cross-head extruder 22 which cross-head extrudes a base over pile 19. The base includes relatively thick, flat support portion 11 and U-shaped portion 12 as previously described with U-shaped portion 12 secured to side edge regions 13 of support 11 and arching over pile 19. Then pressure differential device 14 expands U-shaped portion 12 to arch it higher over pile 19 and reduce the thickness of the walls of U-shaped portion 12. Then cutting device 15 cuts U-shaped portion 12 as illustrated to leave thin, resilient fins 16 on opposite sides of pile material 19. The expansion of U-shaped portion 12 stretches fins 16 to a resilient, thin sheet form that is optimum for fins 16 and is thinner than could be practically extruded as an original shape.

FIG. 3 shows pile material 23 formed by flocking fibrous pile filaments 23 in place in the region between fins 16 on support portion 11. This method can be used in conjunction with the process of FIG. 1 as a means for placing pile between fins 16. Separate pile strips 24 with associated bases 25 as shown in FIG. 4 can be secured between fins 16 as the last step of the method of FIG. 1, or can be fed to a cross-head extruder for practicing the method of FIG. 2.

Figure 5:
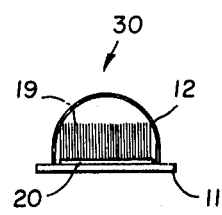

FIG. 5 shows a weatherseal 30 made according to the cross-head extrusion method of FIG. 2 having support portion 11 under base 20 of pile 19, and U-shaped portion 12 arching over pile 19. A pressure differential is used to expand U-shaped portion 12 slightly above pile 19 as illustrated in FIG. 5 rather than the substantially greater expansion illustrated in the method of FIG. 2, and then U-shaped portion 12 is left uncut in the final weatherseal 30 so that U-shaped portion 12 provides a low-friction sealing engagement surface with high resiliency to accommodate various sealing surfaces, and pile 19 provides resilient support preventing U-shaped portion 12 from collapsing. U-shaped portion 12 then need be expanded only slightly to clear pile 19 by a small amount to produce the desired flexibility, and U-shaped portion 12 makes pile 19 airtight and watertight and provides a highly resilient surface to be pressed against a surface to be sealed by the resilience of supporting pile 19. The method of FIG. 2 with a slight modification then produces a new weatherseal 30 having many of the advantages of resilient pile and added advantages from enclosing the pile in resilient, U-shaped portion 12.

Persons wishing to practice the invention should remember that other embodiments and variations can be adapted to particular circumstances. Even though one point of view is necessarily chosen in describing and defining the invention, this should not inhibit broader or related embodiments going beyond the semantic orientation of this application but falling within the spirit of the invention. For example, those skilled in the art will appreciate the many variations in materials, structures, and method steps that can be made in putting the inventive method into practice.

I claim:

1. A weatherseal making method comprising:
    a. preparing a long, thin strip of pile material;
    b. cross-head extruding a resin base having a relatively thick, generally flat support portion formed on the back of said pile strip and a relatively thin portion U-shaped in cross section and joined to opposite side edge regions of one face surface of said support portion and arching over said pile strip;
    c. while said resin material is still plastic, producing a substantially lower pressure outside said U-shaped portion than inside said U-shaped portion to expand said U-shaped portion away from said support portion and reduce the thickness of the wall of said U-shaped portion; and
    d. setting said resin material with said U-shaped portion expanded over said pile strip.

2. The method of claim 1 including cutting each side of said U-shaped portion at the approximate height of said pile from said support portion to leave a pair of thin, spaced-apart resilient fins extending away from said support portion on opposite sides of said pile strip.

* * * * *